United States Patent [19]

Carmien

[11] Patent Number: 5,664,820
[45] Date of Patent: Sep. 9, 1997

[54] SHOVEL WITH COMPOSITE SOCKET AND PROCESS FOR MANUFACTURING SAME

[76] Inventor: Joseph Allen Carmien, 525 N. Maple Dr., Beverly Hills, Calif. 90210

[21] Appl. No.: 706,997

[22] Filed: Sep. 4, 1996

Related U.S. Application Data

[63] Continuation of Ser. No. 372,437, Jan. 11, 1995, abandoned.

[51] Int. Cl.$^6$ .................. A01B 1/22; B25G 3/02
[52] U.S. Cl. .................. 294/57; 76/113; 403/265; 403/298
[58] Field of Search .................. 294/49, 57; 403/265, 403/268, 292, 295, 298; 76/113, 119; 172/371

[56] References Cited

U.S. PATENT DOCUMENTS

| Re. 32,364 | 2/1987 | Carmien . | |
|---|---|---|---|
| 206,122 | 7/1878 | Nixon | 172/371 |
| 641,925 | 1/1900 | Blundell | 172/371 |
| 657,422 | 9/1900 | Judd . | |
| 1,218,145 | 3/1917 | Whittier | 294/49 |
| 1,374,336 | 4/1921 | Surbaugh . | |
| 1,755,236 | 4/1930 | Brandenburg . | |
| 2,031,556 | 2/1936 | Brandenburg . | |
| 2,063,774 | 12/1936 | Washington . | |
| 2,238,104 | 4/1941 | Finley . | |
| 2,960,230 | 11/1960 | Fracker | 294/49 |
| 3,009,726 | 11/1961 | Duppengiesser | 294/57 |
| 3,549,189 | 12/1970 | Alosi . | |
| 4,050,727 | 9/1977 | Bonnes . | |
| 4,451,073 | 5/1984 | Carmien . | |
| 4,570,988 | 2/1986 | Carmien . | |
| 4,605,254 | 8/1986 | Carmien . | |
| 4,718,708 | 1/1988 | Zacuto | 294/57 |
| 5,097,909 | 3/1992 | Jauhal et al. | 172/371 |
| 5,123,304 | 6/1992 | Carmien . | |
| 5,213,014 | 5/1993 | Carmien . | |
| 5,310,230 | 5/1994 | Carmien . | |

FOREIGN PATENT DOCUMENTS

| 1 376 180 | 12/1974 | United Kingdom . | |
|---|---|---|---|
| 2118431 | 11/1983 | United Kingdom | 294/57 |

*Primary Examiner*—Dean Kramer
*Attorney, Agent, or Firm*—Kelly Bauersfeld Lowry & Kelley, LLP

[57] ABSTRACT

A process for manufacturing a shovel includes the steps of stamping a substantially flat shovel blade from sheet metal stock, attaching a molded composite handle adapter to the shovel blade, and fastening a tool handle to the handle adapter. The resultant shovel includes a shovel blade having a platform on an upper surface thereof and a foot tread extending the width of a rear edge of the blade, and a handle securely fixed to the blade via the handle adapter. The handle adapter has an enlarged base at a first end thereof seated on the platform of the blade, a handle receiving socket at a second end thereof, and an angular intermediate portion. A connecting stud has a first end embedded in the intermediate portion of the handle adapter, and a second end which extends into the handle receiving socket. The tool handle has an end secured within the handle receiving socket such that the second end of the connecting stud is embedded therein.

7 Claims, 1 Drawing Sheet

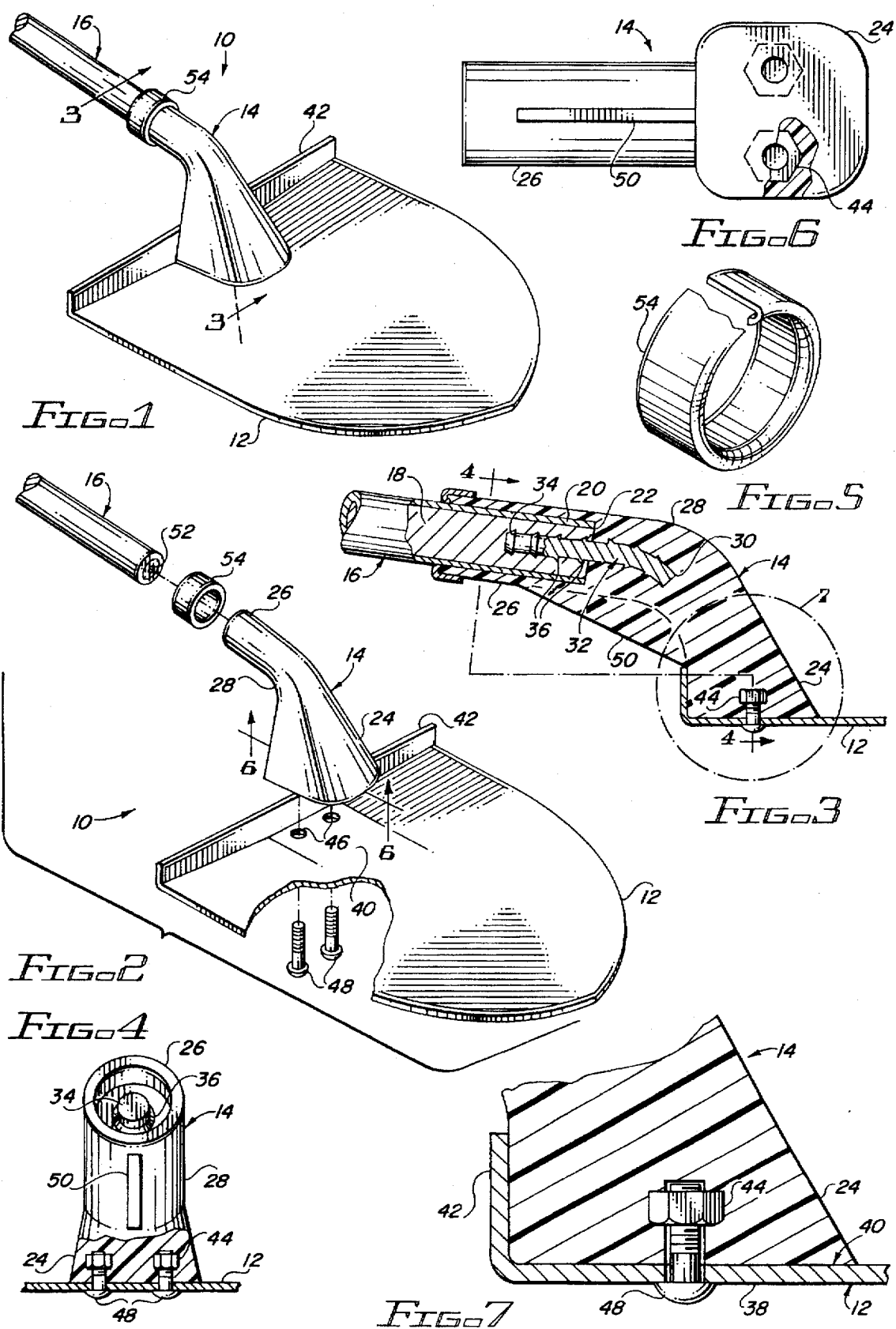

SHOVEL WITH COMPOSITE SOCKET AND PROCESS FOR MANUFACTURING SAME

This is a continuation of application Ser. No. 08/372,437, filed Jan. 11, 1995 now abandoned.

BACKGROUND OF THE INVENTION

This invention relates generally to hand tools. More specifically, the present invention relates to a shovel utilizing a composite socket to attach a tool handle to the blade, and a process for manufacturing such shovels.

With the advent of the technology of forging steel billets into hand tools, the highest quality shovel blade was made by heating a billet of steel and hammering it into a form that provided a blade appropriately styled to scoop or dig earth. Because the blade was forged, the attack edge could be made appropriately thin, and as the blade progressed back towards the handle, it could be made thicker to give the blade the amount of stiffness and strength required in the use of the shovel. Originally, emanating from the center of the back or rear edge of the shovel blade, was a tang (as opposed to a socket) similar to the tangs commonly used today in rakes and hoes. The tang was subsequently jammed into a hole in a wooden handle, and an appropriate steel sleeve was provided over the end of the handle to provide the breakout resistance strength required.

The forged shovel, to this day, is the absolute top of the line for a number of reasons. Such shovels have blades which provide a relatively thin, sharp attack edge, that thicken out as the blade approaches a rear edge to provide stiffness and strength, and which provide a substantially flat surface on the underside of the blade to preclude the collecting of mud and clay. Further, forged shovels usually accommodate a good-sized tread on which the workman's foot can comfortably step, and may be reinforced by having extra steel in those areas of the blade surrounding the handle-engaging tang.

Over the years evolution and competition have brought about the manufacture of shovel blades from flat, cold-rolled sheet steel, which could be produced at a fraction of the labor costs of the forged blades. However, many concessions were made in the design of such newer stamped blades, which the marketplace has accepted because of the substantially lower costs of these blades notwithstanding their inferior characteristics.

For example, in modern stamped shovel blades, the back end of the dish is formed into a standing rib to provide a minimum acceptable level of stiffness. In contrast, the forged blade typically included more massive steel located in that location. By creating a standing rib in modern shovel blades to provide stiffness, a corresponding hollow is created on the underside of the blade which traps mud and clay. In more demanding applications, a flat plate is welded over the backside of the shovel indentation to simulate the "closed" back of the forged shovel. This is a problem addressed in U.S. Pat. Nos. 5,213,014 and 5,310,230 the contents of which are incorporated herein.

Further, to economize on the manufacturing operation, the original blank of the stamped blade includes a projection which when rolled into a circle provides a socket for the shovel handle. At the transition from the socket created for acceptance of the handle and the tread on which the workman's foot must rest, there is but the one thickness of the original steel sheet. This area of stamped blades is known to be a weak point which fails and rips when the shovel is heavily loaded. Moreover, since the socket circle or ring is not ordinarily locked in a closed position by welding, a hole is drilled in it to accept a rivet which provides the attachment for the handle in the socket and to keep the ring or circle closed. Furthermore, because the blade and socket are all made from one stamped piece of sheet steel, the area between the end of the shovel handle and the handle socket as it meets the blade should be filled with something (usually a piece of wood) to keep it from collapsing, which may occur when the shovel is used as a pry. This particular problem is addressed in U.S. Pat. No. Re. 32,364, the contents of which are incorporated herein.

From the foregoing it is readily seen that when industry attempted to reduce the cost of a shovel going from the forged model to the stamped model, a great number of concessions were made which the public has learned to accept. In addition to those noted above, a further concession in the stamped shovel has been the continuing extension of the socket length to accommodate a decline in the grade of wood available for handles. This, of course, compounds the concessions by using more steel and having a greater amount of scrap—that portion of the blank that is thrown away outboard on either side of the socket in its flat pattern.

Accordingly, there has been a need for an improved shovel design which utilizes the advantages inherent in stamped shovel blades, but eliminates the concessions in strength and durability in comparison with forged blades. Such a shovel would preferably permit the shovel blade to be produced using roughly half the area of the sheet metal stock typically required in the manufacture of conventional stamped shovel blades. Further, the improved shovel should provide a shovel blade having an improved and increased step or tread for the workman's foot, which may also serve as a stiffening member for the shovel blade itself, and provide for attachment of the handle at a point on the blade which will aid in the stiffness thereof and in dispersion of the load thereon. Moreover, such a shovel should have a substantially flat back surface for the shovel blade, to eliminate any mud and clay trap or the need to add a frog or cover. Additionally, such an improved shovel should accommodate modern composite resin tool handles. The present invention fulfills these needs and provides other related advantages.

SUMMARY OF THE INVENTION

The present invention resides in an improved shovel design that utilizes a molded handle adapter to connect a composite tool handle with a stamped shovel blade, and which satisfies each of the aforementioned needs. The present invention further resides in an improved process for manufacturing such an improved shovel. In this regard, the process comprises the steps of stamping a substantially flat shovel blade from sheet metal stock, attaching a molded composite handle adapter to the shovel blade, and fastening a tool handle to the tool adapter.

In a preferred form of the invention, the shovel blade includes an upturned foot tread which extends the width of the blade. Mechanical fasteners are utilized to attach the handle adapter to the shovel blade. To fasten the tool handle to the handle adapter, a connecting stud fixed to the handle adapter is heated, and then a thermoplastic section of an end of the tool handle is driven onto the heated connecting stud. As the heated connecting stud engages the tool handle, the thermoplastic section is softened to permit entry of the connecting stud whereby the thermoplastic material of the thermoplastic section flows into intimate contact around the connecting stud and then hardens as the heat of the connecting stud is dissipated.

The resultant shovel comprises a substantially flat shovel blade having a planar platform on an upper surface thereof, and a foot tread extending the width of a rear edge of the blade. An enlarged base at a first end of the molded composite handle adapter is seated on the planar platform of the blade. Fasteners extending through, the blade and into the base mechanically engage nuts within the handle adapter base to connect the base to the blade. A handle receiving socket is disposed at a second end of the handle adapter, and an angular intermediate portion thereof connects the enlarged base and the handle receiving socket.

A connecting stud has a first end embedded in the intermediate portion of the handle adapter. A second end of the connecting stud extends centrally into the handle receiving socket. As an end of the tool handle is secured within the handle receiving socket, the second end of the connecting stud is embedded therein.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 1 is a partially fragmented top, front and right side perspective view of a shovel embodying the invention;

FIG. 2 is an exploded perspective view similar to FIG. 1, illustrating the several components of the shovel which are assembled together during a manufacturing process;

FIG. 3 is an enlarged fragmented sectional view taken generally along the line 3—3 of FIG. 1;

FIG. 4 is an enlarged, fragmented and partially sectional view taken generally along the line 4—4 of FIG. 3;

FIG. 5 is an enlarged perspective view of a collar;

FIG. 6 is a bottom plan view, in a partial section, taken generally along the line 6—6 of FIG. 2; and FIG. 7 is an enlarged, fragmented sectional view of the area indicated by the number 7 in FIG. 3.

DETAILED DESCRIPTION OF THE PREFERRED EMBODIMENT

As shown in the drawings for purposes of illustration, the present invention is concerned with an improved shovel, generally designated in the accompanying drawings by the reference number 10. In accordance with the present invention, the shovel 10 comprises a substantially flat shovel blade 12, a molded composite handle adapter 14, and a tool handle 16. The tool handle 16 is preferably of the fiber-resin composite type as shown and described in U.S. Pat. Nos. 4,570,988 and 4,605,254, the contents of which are incorporated herein.

In manufacturing a typical fiber-resin composite tool handle, a fiber material is drawn through a resin bath and into a die tube where the resin is cured. As the fibers enter the die tube, alternating sections of a hollow tubing and a solid reinforcing core of a thermoplastic material are inserted into the center of the die tube and are simultaneously surrounded by the fibers and drawn into and through the die tube. By this method, a continuous hollow fiberglass rod can be quickly and easily manufactured with a reinforced thermoplastic section 18 provided at any location within a fiber-resin jacket 20, such as at an end 22 of the tool handle 16 to be attached to the handle adapter 14.

The handle adapter 14 is preferably molded of an engineering plastic such as a glass reinforced fiberglass, and includes an enlarged base 24 at a first end thereof, a handle receiving socket 26 at a second end thereof, and an angular intermediate portion 28. A first end 30 of a connecting stud 32 is embedded within the intermediate portion 28 of the handle adapter 14, and a second end 34 of the connecting stud extends into the handle receiving socket 26. The connecting stud 32 is preferably provided a series of ridges and grooves 36, which serve to securely position the connecting stud, first, in the intermediate portion 28 of the handle adapter 14, and secondly, within the thermoplastic section 18 of the end 22 of the tool handle 16.

The shovel blade 12 is preferably stamped from flat sheet metal stock into the configuration shown. The shovel blade 12 has a substantially flat shovel back 38 which simulates a "closed" back shovel, a planar platform 40 on an upper surface thereof, and a foot tread 42 extending the width of a rear edge of the blade. This particular configuration for the shovel blade 12 eliminates unacceptable flexing, bending or twisting of the shovel blade in use.

The handle adapter 14 is secured to the shovel blade 12 by placing a generally planar surface of the handle adapter base 24 against the planar platform 40 of the blade. Nuts 44 are molded within the handle adapter base 24, and apertures 46 are provided through the platform 40 and a portion of the base 24 through which bolts 48 extend to engage the nuts 44 And connect the blade 12 and the handle adapter 14 together. This attachment of the handle adapter 14 to the shovel blade 12 moves the loads to be applied through the handle adapter to the shovel blade to the stiffest portion of the blade design. Further, the handle adapter 14 is molded to include a gusset 50 extending rearwardly from the intermediate portion 28 and between the base 24 and the handle receiving socket 26, to enhance the high strength characteristics of the handle adapter 14.

To fasten the tool handle 16 to the handle adapter 14, the second end 34 of the connecting stud 32 is heated so that as the end 22 of the tool handle 16 is inserted into the handle receiving socket 26, the heated second end 34 of the connecting stud 32 engages the walls of a cavity 52 provided in the thermoplastic section 18 of the tool handle. In the same manner as described in detail in U.S. Pat. No. 5,123, 304, the contents of which are incorporated herein, as the heated connecting stud engages the tool handle 16, the thermoplastic section 18 surrounding the cavity 52 is softened to permit entry of the connecting stud whereby the thermoplastic material of the thermoplastic section flows into intimate contact around the connecting stud and then hardens as the heat of the connecting stud is dissipated.

A collar 54 may be provided at a suitable location on the tool handle 16 to provide a visual indication of when the end 22 of the tool handle 16 is fully inserted into the handle receiving socket 26.

From the foregoing it is to be appreciated that the shovel 10 of the present invention provides substantial improvements over standard stamped shovel designs by reducing the tool weight, eliminating the open back of the shovel blade, increasing the stiffness of the tool blade, improving the tread on which the workman presses his foot, reducing the amount of steel required for the blank, improving the appearance of the shovel, and providing optional handle blade angles simply by interchanging the handle adapter 14. Further, because of the particular materials utilized, the length of the handle receiving socket 26 may be as short as three or four inches, in comparison with six-inch to thirteen-inch handle receiving sockets now found in many shovel designs. This greatly improves the hand working area on the handle 16.

Although a particular embodiment of the invention has been described in detail for purposes of illustration, various modifications may be made without departing from the spirit and scope of the invention. Accordingly, the invention is not to be limited, except as by the appended claims.

I claim:

1. A shovel, comprising:

a substantially flat shovel blade;

a molded plastic composite handle adapter including a generally planar base at a first end thereof seated on an upper surface of a corresponding platform of the blade, a handle receiving socket at a second end thereof, and an angular intermediate portion;

means for attaching the handle adapter base to the blade platform, the attaching means comprising fasteners extending through the blade platform into engagement with the handle adapter for mechanically fixing the handle adapter base to the blade, wherein the fasteners are threadably received within the handle adapter, and a nut within the handle adapter for threadably receiving a threaded shaft of a respective fastener;

a composite tool handle having an end thereof positioned within the handle receiving socket; and a connecting stud having a first end embedded in the intermediate portion of the handle adapter, and a second end embedded in the end of the tool handle within the handle receiving socket.

2. The shovel of claim 1, wherein the blade includes a foot tread extending the entire width thereof.

3. A shovel, comprising:

a substantially flat shovel blade having a foot tread extending the width of a rear edge of the blade;

a molded plastic composite handle adapter including a generally planar base at a first end thereof seated on an upper surface of the blade, a handle receiving socket at a second end thereof, and an angular intermediate portion;

means for attaching the handle adapter base to the blade, the attaching means including a fastener having a threaded shaft extending through the blade and into threaded engagement with a corresponding threaded nut captured within the handle adapter, for mechanically fixing the handle adapter base to the blade;

a connecting stud having a first end embedded in the intermediate portion of the handle adapter, and a second end which extends into the handle receiving socket; and a composite tool handle having an end thereof secured within the handle receiving socket such that the second end of the connecting stud is embedded in the secured end thereof.

4. A process for manufacturing a shovel, comprising the steps of:

stamping a substantially flat shovel blade from sheet metal stock;

attaching a molded plastic composite handle adapter having a generally planar base at a first end thereof to an upper surface of the shovel blade utilizing mechanical fasteners extending through the shovel blade and threadably received by nuts molded within the handle adapter; and fastening a composite tool handle to the handle adapter by inserting an end of the tool handle into a handle receiving socket of the handle adapter, and simultaneously driving the end of the tool handle onto a connecting stud disposed within the handle receiving socket and fixed to the handle adapter.

5. The process of claim 4, wherein the stamping step includes the step of creating a foot tread extending the width of the shovel blade.

6. The process of claim 4, wherein the fastening step includes the steps of heating the connecting stud and driving a thermoplastic section within the end of the tool handle onto the heated connecting stud such that as the heated connecting stud engages the tool handle, the thermoplastic section is softened to permit entry of the connecting stud whereby thermoplastic material of the thermoplastic section flows into intimate contact around the connecting stud and then hardens as the heat of the connecting stud is dissipated to hold the connecting stud in place.

7. A process for manufacturing a shovel, comprising the steps of:

stamping a substantially flat shovel blade including an upturned foot tread extending the width thereof from sheet metal stock;

attaching a molded plastic composite handle adapter paving a generally planar base at a first end thereof to an upper surface of the shovel blade utilizing threaded fasteners extending through the shovel blade and received by threaded nuts molded within the handle adapter; and fastening a composite tool handle to the handle adapter, including the steps of heating a connecting stud fixed to the handle adapter, inserting an end of the tool handle into a handle receiving socket of the handle adapter and simultaneously driving a thermoplastic section of the end of the tool handle onto the heated connecting stud such that as the heated connecting stud engages the tool handle, the thermoplastic section is softened to permit entry of the connecting stud whereby thermoplastic material of the thermoplastic section flows into intimate contact around the connecting stud and then hardens as the heat of the connecting stud is dissipated to hold the connecting stud in place.

* * * * *

UNITED STATES PATENT AND TRADEMARK OFFICE
CERTIFICATE OF CORRECTION

PATENT NO. : 5,664,820
DATED : September 9, 1997
INVENTOR(S) : Joseph Allen Carmien It is certified that error appears in the above-identified patent and that said Letters Patent is hereby corrected as shown below:

In claim 7, line 7, delete "paving" and insert therefor --having--.

Signed and Sealed this

Sixteenth Day of December, 1997

Attest:

BRUCE LEHMAN

Attesting Officer

Commissioner of Patents and Trademarks